US 12,316,863 B2

(12) United States Patent
Wu et al.

(10) Patent No.: US 12,316,863 B2
(45) Date of Patent: May 27, 2025

(54) CHROMA-FROM-LUMA MODE SELECTION FOR HIGH-PERFORMANCE VIDEO ENCODING (71) Applicant: NVIDIA Corporation, Santa Clara, CA (US)

(72) Inventors: Yonghai Wu, Shanghai (CN); Jianjun Chen, Shanghai (CN); Yongmao Tang, Shanghai (CN); Jing Yang, Shanghai (CN); Wei Feng, Shanghai (CN)

(73) Assignee: NVIDIA Corporation, Santa Clara, CA (US)

( * ) Notice: Subject to any disclaimer, the term of this patent is extended or adjusted under 35 U.S.C. 154(b) by 139 days.

(21) Appl. No.: 18/302,607

(22) Filed: Apr. 18, 2023

(65) Prior Publication Data

US 2024/0357090 A1    Oct. 24, 2024

(51) Int. Cl.
*H04N 19/186*    (2014.01)
*G06V 10/74*    (2022.01)
*H04N 9/804*    (2006.01)
*H04N 19/11*    (2014.01)
*H04N 19/176*    (2014.01)

(52) U.S. Cl.
CPC ......... *H04N 19/186* (2014.11); *G06V 10/761* (2022.01); *H04N 9/804* (2013.01); *H04N 9/8042* (2013.01); *H04N 9/8045* (2013.01); *H04N 19/11* (2014.11); *H04N 19/176* (2014.11)

(58) Field of Classification Search
CPC .... H04N 9/804; H04N 9/8042; H04N 9/8045; H04N 19/11; H04N 19/186
See application file for complete search history.

(56) References Cited

U.S. PATENT DOCUMENTS 8,311,111 B2    11/2012    Xu et al.
9,432,668 B1    8/2016    Bossen et al.
(Continued)

FOREIGN PATENT DOCUMENTS

CN    108449603 A    8/2018
CN    111918058 A    11/2020
(Continued)

OTHER PUBLICATIONS

W. Li, X. Jiang, T. Song, & D. Han, "Adaptive Cross Component Linear Model for Chroma Intra-Prediction in VVC", Proc. of 10 Int'l Conf. on Comms. & Broadband Networking 52--59 (Jul. 14, 2022) (Year: 2022).*

(Continued)

*Primary Examiner* — David N Werner
(74) *Attorney, Agent, or Firm* — Lowenstein Sandler LLP (57) ABSTRACT

Disclosed are systems and techniques for efficient real-time codec encoding of video files. In one embodiments, the techniques include receiving one or more intra-prediction modes, each having a corresponding cost; calculating a first cost of a chroma-from-luma intra-prediction mode; calculating a second cost of the chroma-from-luma intra-prediction mode; and calculating a final cost based on the first cost and the second cost. The techniques also include selecting a final intra-prediction mode; generating, based on the selected final intra-prediction mode, a block of predicted pixels that approximates a block of source pixels of an image frame; and encoding a first alpha value in a bitstream.

20 Claims, 7 Drawing Sheets

(56) References Cited

U.S. PATENT DOCUMENTS

| | | |
|---|---|---|
| 9,998,726 B2 | 6/2018 | Rusanovskyy et al. |
| 10,070,128 B2 | 9/2018 | Ugur et al. |
| 10,091,514 B1 | 10/2018 | Bossen et al. |
| 10,621,731 B1 | 4/2020 | Duenas et al. |
| 10,687,054 B2 | 6/2020 | Mahdi et al. |
| 10,887,611 B2 | 1/2021 | Seregin et al. |
| 10,999,594 B2 | 5/2021 | Hsieh et al. |
| 11,017,566 B1 | 5/2021 | Tourapis et al. |
| 11,057,636 B2 | 7/2021 | Huang et al. |
| 11,070,813 B2 | 7/2021 | Socek et al. |
| 11,172,195 B2 | 11/2021 | Seregin |
| 11,197,009 B2 | 12/2021 | Zhang et al. |
| 11,202,070 B2 | 12/2021 | Zhang et al. |
| 11,218,694 B2 | 1/2022 | Seregin et al. |
| 11,272,201 B2 | 3/2022 | Seregin et al. |
| 11,317,111 B2 | 4/2022 | Rusanovskyy et al. |
| 11,343,504 B2 | 5/2022 | Zhao et al. |
| 11,368,684 B2 | 6/2022 | Seregin et al. |
| 11,388,394 B2 | 7/2022 | Seregin et al. |
| 11,496,746 B2 | 11/2022 | Siddaramanna et al. |
| 11,563,933 B2 | 1/2023 | Seregin et al. |
| 11,582,475 B2 | 2/2023 | Rusanovskyy et al. |
| 11,638,025 B2 | 4/2023 | Pourreza et al. |
| 11,638,062 B2 | 4/2023 | Stockhammer et al. |
| 11,677,987 B2 | 6/2023 | Said |
| 2010/0118945 A1 | 5/2010 | Wada et al. |
| 2011/0170604 A1* | 7/2011 | Sato ............... H04N 19/176 375/E7.243 |
| 2013/0016783 A1 | 1/2013 | Kim et al. |
| 2013/0101035 A1 | 4/2013 | Wang et al. |
| 2013/0114706 A1* | 5/2013 | Gisquet ............ H04N 19/593 375/240.12 |
| 2013/0259142 A1 | 10/2013 | Ikeda et al. |
| 2014/0198844 A1 | 7/2014 | Hsu et al. |
| 2015/0229921 A1 | 8/2015 | Chen et al. |
| 2016/0225161 A1 | 8/2016 | Hepper |
| 2016/0330445 A1 | 11/2016 | Ugur et al. |
| 2017/0085886 A1 | 3/2017 | Jacobson et al. |
| 2017/0142438 A1 | 5/2017 | Hepper |
| 2017/0201769 A1 | 7/2017 | Chon et al. |
| 2017/0272758 A1 | 9/2017 | Lin et al. |
| 2018/0205946 A1* | 7/2018 | Zhang ............... H04N 19/103 |
| 2020/0021847 A1 | 1/2020 | Kim et al. |
| 2020/0029096 A1 | 1/2020 | Rusanovskyy |
| 2020/0099926 A1 | 3/2020 | Tanner et al. |
| 2020/0104976 A1 | 4/2020 | Mammou et al. |
| 2020/0105024 A1 | 4/2020 | Mammou et al. |
| 2020/0111237 A1 | 4/2020 | Tourapis et al. |
| 2020/0137415 A1 | 4/2020 | Esenlik et al. |
| 2020/0204829 A1 | 6/2020 | Stepin et al. |
| 2020/0288122 A1 | 9/2020 | Kim |
| 2020/0288135 A1* | 9/2020 | Laroche ............. H04N 19/105 |
| 2020/0296391 A1* | 9/2020 | Choi ................. H04N 19/182 |
| 2020/0359022 A1 | 11/2020 | Abe et al. |
| 2020/0382777 A1 | 12/2020 | Zhang et al. |
| 2020/0382804 A1 | 12/2020 | Zhang et al. |
| 2021/0006833 A1 | 1/2021 | Tourapis et al. |
| 2021/0021809 A1 | 1/2021 | Kim |
| 2021/0029352 A1* | 1/2021 | Zhang ............... H04N 19/70 |
| 2021/0099701 A1 | 4/2021 | Tourapis et al. |
| 2021/0211661 A1 | 7/2021 | Toma et al. |
| 2021/0211703 A1 | 7/2021 | Kim et al. |
| 2021/0211724 A1 | 7/2021 | Kim et al. |
| 2021/0217203 A1 | 7/2021 | Kim et al. |
| 2021/0321093 A1 | 10/2021 | Sundaram et al. |
| 2021/0377868 A1 | 12/2021 | Anand |
| 2021/0392334 A1 | 12/2021 | Esenlik et al. |
| 2022/0021891 A1 | 1/2022 | Chaudhari et al. |
| 2022/0256169 A1 | 8/2022 | Siddaramanna et al. |
| 2022/0277164 A1 | 9/2022 | Malayath |
| 2022/0279204 A1 | 9/2022 | Malayath et al. |
| 2022/0312020 A1* | 9/2022 | Li ..................... H04N 19/159 |
| 2023/0063062 A1 | 3/2023 | Srinivasan et al. |
| 2023/0071018 A1 | 3/2023 | Tang et al. |
| 2023/0336711 A1* | 10/2023 | Teng ................. H04N 19/103 |
| 2024/0022739 A1* | 1/2024 | Li ..................... H04N 19/105 |
| 2024/0137515 A1* | 4/2024 | Zhao ................. H04N 19/176 |
| 2024/0187569 A1* | 6/2024 | Wang ................ H04N 19/70 |
| 2024/0187575 A1* | 6/2024 | Wang ................ H04N 19/176 |
| 2025/0008111 A1* | 1/2025 | Yoo .................. H04N 19/119 |

FOREIGN PATENT DOCUMENTS

| | | | |
|---|---|---|---|
| CN | 113301347 A | 8/2021 | |
| GB | 2580106 A * | 7/2020 | ............ H04N 19/11 |
| JP | 2014127891 A | 7/2014 | |
| WO | 2010030752 A2 | 3/2010 | |
| WO | 2012030752 A2 | 3/2012 | |
| WO | 2013067903 A1 | 5/2013 | |
| WO | 2019163794 A1 | 8/2019 | |
| WO | WO-2023198142 A1 * | 10/2023 | |

OTHER PUBLICATIONS

J. Huo, H. Du, X. Li, S. Wan, H. Yuan, Y. Ma, & F. Yang, "Unified Cross-Component Linear Model in VVC Based on a Subset of Neighboring Samples", 18 IEEE Transactions on Indus. Informatics 8654--8863 (Dec. 2022) (Year: 2022).*

Chen Y., et al., "An Overview of Core Coding Tools in AV1 Video Codec," Picture Coding Symposium (PCS), Jun. 24-27, 2018, 5 Pages, DOI: 10.1109/PCS.2018.8456249.

Goebel et al., "Hardware Design of DC/CFL Intra-Prediction Decoder for AV1 Codec," 32nd Symposium of Integrated Circuits and Systems Design (SBCCI), Sao Paulo, Brazil, Aug. 26-30, 2019, pp. 1-6.

Han J., et al., "A Technical Overview of AV1," arXiv:2008.06091v2 [eess.IV], Feb. 8, 2021, 25 Pages.

International Search Report and Written Opinion for International Application No. PCT/CN2021/116311, mailed May 31, 2022, 6 Pages.

International Search Report and Written Opinion for International Application No. PCT/CN2021/116312, mailed May 26, 2022, 9 Pages.

International Search Report and Written Opinion for International Application No. PCT/CN2021/116711, mailed Apr. 24, 2022, 7 Pages.

ITU-T; H.265 (Year: 2016).

ITU-T; H.266 (Year: 2020).

* cited by examiner

CHROMA-FROM-LUMA MODE SELECTION FOR HIGH-PERFORMANCE VIDEO ENCODING

TECHNICAL FIELD

At least one embodiment pertains to computational technologies used to perform and facilitate efficient compression of video files. For example, at least one embodiment pertains to operations that determine a cost of a chroma-from-luma intra-frame prediction mode to optimize between reduction in the amount of information encoded by codecs and preventing significant distortions of the encoded video frames.

BACKGROUND

A video file in a raw (source) pixel format can occupy a very large memory space and require a large network bandwidth for transmission, which can be impractical for storage and/or livestreaming. For example, a typical high-definition video displays about 30 frames per second with frames that are typically rather similar to each other. A lot of information in such frames is necessarily redundant, allowing efficient compression. On the one hand, relatively minor changes occur between many subsequent frames (temporal redundancy). On the other hand, various regions in a given frame are often similar to each other (spatial redundancy), e.g., an image of the sky can extend over a large portion of a frame. As a result, in lieu of transmitting the actual pixel information (luminance and chromaticity) of each pixel, a codec can identify a reference block that is similar to the block being encoded ("predicted") and provide to a decoder a suitable and compact mathematical representation of the difference ("delta") between the actual source block and the predicted block. The reference block can be a block of a different (e.g., previous, or even subsequent) frame, a block of the same frame, or even a synthetic block generated according to some predetermined scheme (mode) based on a small number of reference pixels. Subsequently, instead of storing or livestreaming the actual frame of pixels, the codec can output a bit stream of encoded data, which largely contains instructions to the decoder about how to generate an approximation of the frame whose visual appearance is indistinguishable from or very similar to the source frame.

DETAILED DESCRIPTION

High-performance codecs, such as H.264 (Advanced Video Coding or AVC), H.265 (High Efficiency Video Coding or HEVC), and VP9, allow efficient encoding that is based on finding similar blocks in the same frame (referred to as intra-frame prediction) and/or different frames (referred to as inter-frame prediction). Finding intra-frame prediction blocks can be performed along multiple spatial directions (e.g., 8 directions in AVC and 33 directions in HEVC). Likewise, finding inter-frame prediction blocks can be performed with sub-pixel accuracy, in which a vector of translation (rotation, affine transformation, etc.), referred to herein as a motion vector, specifies the relative displacement of similar blocks in different frames. Blocks of multiple sizes can be processed to identify best predictions, such as (in HEVC) 64×64 pixel blocks, 32×32 pixel blocks, and 16×16 pixel blocks. Multiple block sizes allow for more efficient encoding (of larger portions of the image(s) that are similar to each other) and finer resolution of the portions of the image(s) that contain unique details. VP9 standard allows for an even greater variety of block sizes, including square blocks of 8×8, rectangular blocks of 64×32, 32×64, 32×16, 16×32, 16×8, and 8×16 pixels. Newer codec standards, such as AOMedia Video 1 (AV1), allow even more prediction options. For example, AV1, while inheriting block sizes from VP9, allows for 58 spatial directions for intra-frame predictions. Additionally, AV1 expands on the types of mathematical transforms that can be used to encode residual blocks and numbers and types of filters that can be used to alleviate block boundary artifacts, noise artifacts, motion vector artifacts, and so on.

A conventional AV1 (or other codecs) encoding software can process various superblocks (e.g., 64×64 or 128×128 pixel blocks) sequentially. For example, starting from the top-left superblock 64×64 of a current frame, the software can partition the superblock into all possible (recognized by the codec standard) partitions. A given partition of the superblock can include blocks of multiple sizes. For example, the top-left quadrant of the superblock can be represented by a single 32×32 block, the top-right quadrant can be partitioned into 16 blocks of 8×8 pixels each, the bottom-left quadrant can be partitioned into 2 blocks of 32×16 pixels, and the bottom-right quadrant can be partitioned into 8 blocks of 16×8 pixels. Numerous other partition schemes are also possible. Each block (regardless of the size) in the selected partition scheme can then be approximated (predicted) using inter-frame predictions as well as intra-frame predictions.

During the inter-frame predictions, a block that is the most similar to the current block can be identified in one or more reference frames (previous frames and/or subsequent frames). Closely spaced (in time) frames are likely to be similar to each other (unless a complete change of scenery occurs), with various objects experiencing rather small displacements. As a result, it is often sufficient to explore, in the reference frame(s), a relatively close neighborhood of the current block. The best inter-frame prediction candidate can be selected by minimizing an error value of a cost function that characterizes a difference between the pixels of the inter-frame prediction candidate block and source pixels of the current block.

During the intra-frame predictions, the same block may be approximated based on reference pixels for the block. Typically, reference pixels are boundary pixels of the adjacent blocks (e.g., pixels that are near the top and left boundaries of the current block). Pixels of the current block are inferred from the reference pixels by extrapolation (e.g., from the top row or the left column of reference pixels) or interpolation (from both the top row and the left column) along various directions recognized by the codec standard. Extrapolation or interpolation of pixels of the current block is performed according to specific formulas that depend on the direction (mode) and are defined as part of the codec standard. Similarly to the inter-frame predictions, the best intra-frame prediction candidate(s) can be selected by minimizing the error value of the cost function and based on how well various intra-frame prediction candidates approximate the source pixels of the current block.

The best inter-frame prediction candidate block and the best intra-frame prediction candidate block (generated using the respective winning intra-frame prediction mode) may be then compared to each other, and a final winner candidate block may be selected. The obtained final winner block, generally, has pixels that are different from the source pixels of the current block. The pixel values of the predicted block subtracted from the source block constitute a residual block. Even though the residual block likely has variations of pixel values that are distributed over the entire area of the block, such variations are usually smooth. This means that a discrete Fourier transform (or some other discrete transform) has coefficients $C_{jk}$ that are concentrated near a long-wavelength end of the transform (e.g., smaller indices j and k). The short-wavelength end of the transform (higher indices j and k) is much less likely to be perceived by a human eye and can be truncated (using what is known as a quantization transform), resulting in a much lower number of (Fourier) coefficients needed to encode the residual block. Such coefficients constitute a basis (subject to additional filtering and entropy encoding) of the encoded codec bitstream.

In some embodiments, luminance pixel values (luma values or luma pixels) may be predicted and/or reconstructed for a block of a video frame before chrominance pixel values (chroma values or chroma pixels) are predicted for the same block. For example, if a block is to be predicted using an intra-frame prediction, a first intra-frame prediction mode may be selected for the luma values of the block. A second intra-frame prediction mode may be selected for the chroma values of the block. The intra-frame prediction mode for the chroma values may be the same as (or different from) the intra-frame prediction mode for the luma values.

Some video codecs (e.g., AV1, VVC) have a chroma-from-luma (CFL) intra-prediction mode that uses reconstructed luma pixels of a block to predict the chroma pixels of the block. The relationship between the chroma values and luma values is modeled by a linear function with a slope value (e.g., alpha value) transmitted in the bitstream and an offset value calculated using neighboring reconstructed blocks. The CFL intra-prediction mode may be included in the group of intra-prediction modes that are evaluated during a rate-distortion optimization (RDO) stage of encoding a video frame. The cost of using the CFL intra-prediction mode for a given alpha value may be calculated using a sum of squared difference (SSD) function that compares source pixels to reconstructed pixels. Generating reconstructed pixels for a block may include calculating a residual difference between the source pixels and predicted pixels, transforming the residual, quantizing the residual, reversing the quantization, inversing the transformation, and then combining the result with the predicted pixels.

Considering CFL intra-prediction mode for each block during RDO and using SSD to compare the reconstructed pixels of the CFL intra-prediction mode to source pixels results in a large amount of computation and requires a large circuit area. Aspects and embodiments of the present disclosure address these and other technological challenges of real-time video encoding in modern advanced codecs by providing systems and techniques that determine a cost of a CFL intra-prediction mode to optimize between reduction in the amount of information encoded by codecs and preventing significant distortions of the encoded video frames. More specifically, by evaluating a CFL intra-prediction mode during a reconstruction (RECON) stage of encoding a video frame and by using a sum of absolute transformed difference (SATD) cost function that compares source pixels to predicted pixels instead of reconstructed pixels, an optimal alpha value can be selected using a smaller circuitry area and fewer computations. In some embodiments, the RDO stage may determine, for a given block, a best intra-prediction mode for the chroma values of a block from the list of available intra-prediction modes for chroma values as defined by a codec without considering the CFL intra-prediction mode. Then, during the RECON stage, a cost for the CFL intra-prediction mode may be calculated and compared to the cost of the best intra-prediction mode from the RDO stage. The mode with the lowest cost may be used for encoding the given block in the bitstream.

Advantages of the disclosed embodiments over the existing technology include significant acceleration of the encoding process and a significant reduction in computation required to achieve a similar quality as existing technology. The disclosed techniques allow for parallel evaluation of CFL alpha values and result in an increased quality of the encoded video, especially for gaming or screen content.

System Architecture

Figure 1A:
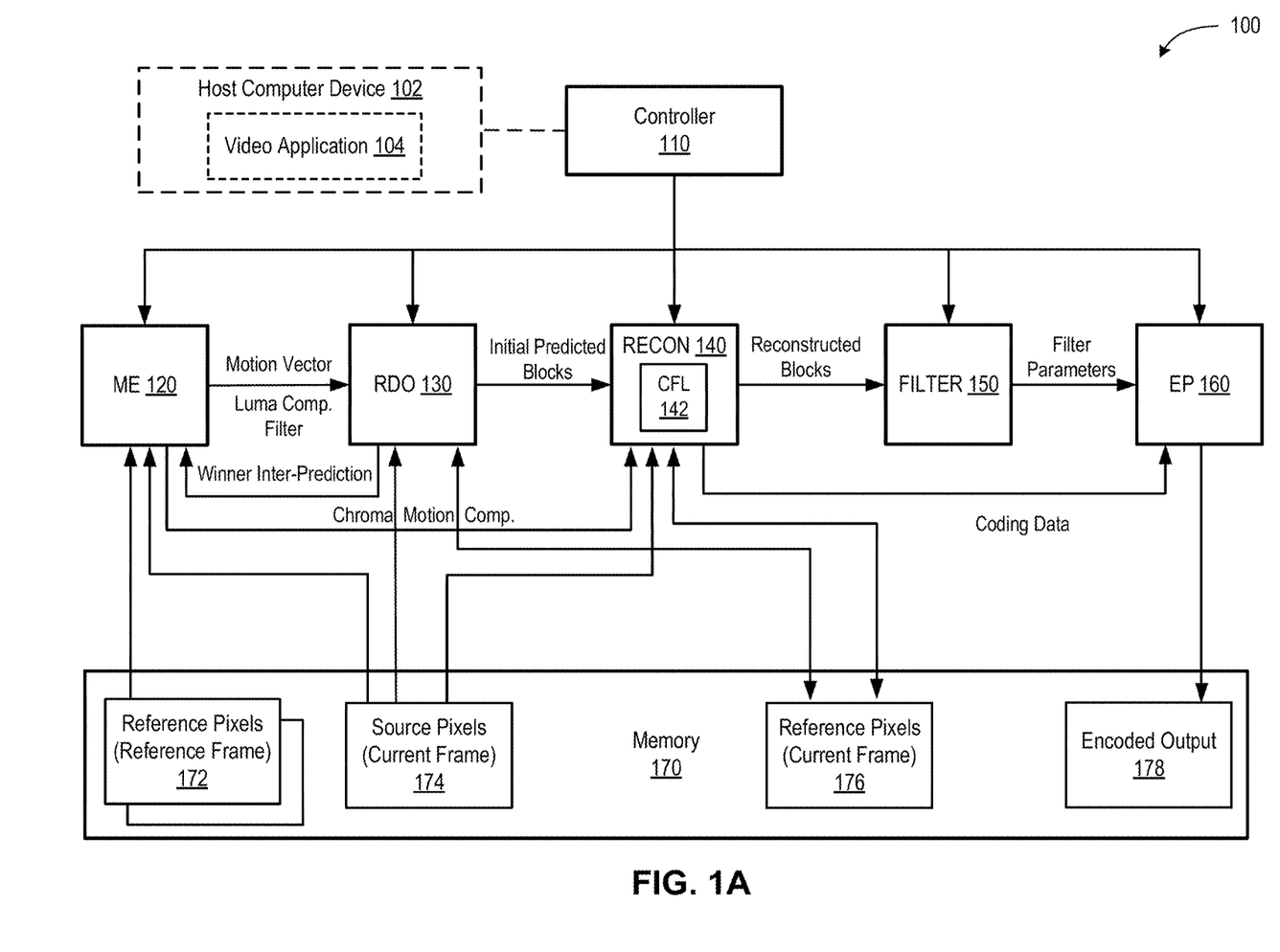
FIG. 1A is a schematic block diagram of an example codec accelerator system used for efficient encoding operations, in accordance with at least some embodiments.

FIG. 1A is a schematic block diagram of an example codec accelerator system 100 used for efficient encoding operations, in accordance with at least some embodiments. Codec accelerator system 100 may be a part of or in communication with a host computer device 102, which may be a desktop computer, a laptop computer, a smartphone, a tablet computer, a local server, a cloud server, a dedicated video processing server, a collection of multiple computing devices, a distributed computing system, a smart TV, an augmented reality device, or any other suitable computing device (or collection of computing devices) capable of performing the techniques described herein. Host computer device 102 may include one or more applications, including a video application 104, which may be any application capable of creating or managing video files. For example, video application 104 may be a video camera application, a video gaming application, a movie-making application, a video-streaming application, a social-networking application, or any other application that may create, render, download, receive, and/or process video files, including but not limited to high-definition video files.

As depicted in FIG. 1A, codec accelerator system 100 may include a controller 110 communicatively coupled to a number of components or functional groups, such as a motion estimation group (ME) 120, a rate distortion optimization group (RDO) 130, a reconstruction group (RECON) 140, a filtering group (FILTER) 150, and an entropy processing group (EP) 160. Each functional group may be implemented via one or more electronic circuits. In some embodiments, any functional group may be combined with any other functional group on the same silicon die. In some embodiments, all functional groups may be implemented (together with or separately from controller 110) on the same die. Any or all of the functional groups may be (or include) a number of configurable logic circuits. The logic circuits of any or all functional groups can be configured by controller 110, which may be an application-specific integrated circuit (ASIC), a finite state machine (FSM), a field-programmable gate array (FPGA), a central processing unit (CPU), a graphics processing unit (GPU), a parallel processing unit (PPU), or some other processing device, or a combination of the aforementioned processing devices. Various functional groups of codec accelerator system 100 may also be communicatively coupled to a memory 170, which may include one or more memory components, such as cache memory, dynamic randomly addressable memory ("DRAM"), static randomly addressable memory ("SRAM"), non-volatile memory (e.g., flash memory), or some other suitable data storage.

Controller 110 may receive instructions from a host computer device 102 identifying a video file to be encoded, e.g., by the file's storage location in memory 170. Responsive to receiving the instructions, controller 110 may initialize the functional groups of codec accelerator system 100. Codec accelerator system 100 may process various frames in the video file sequentially. Each frame may be processed using one or more reference frames. Memory 170 may maintain a status register (not explicitly depicted) indicating frames of the video file that are designated as reference frames. Controller 110 or ME 120 may manage (e.g., access and control) the status register and, from time to time, change designation of reference frames, removing reference designations from some frames and designating other frames as reference frames. In some embodiments, during processing of a current frame, ME 120 may access (receive from memory 170) reference pixels 172 of one or more reference frames, which may include previous frame(s) and/or subsequent frame(s). ME 120 may further access source pixels 174 of the current frame and perform segmentation of the current frame into blocks of various sizes according to the codec standard.

Figure 1B:
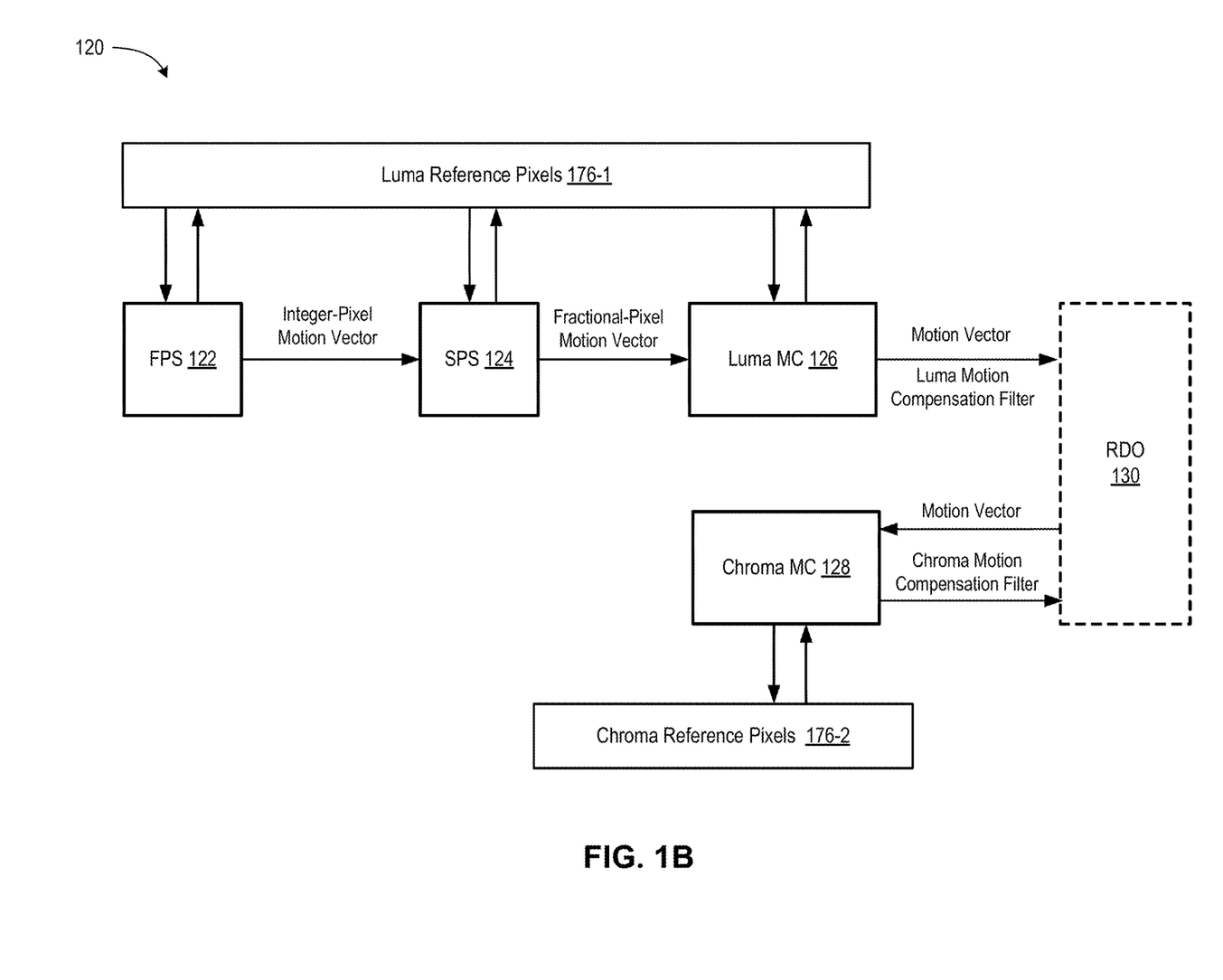
FIG. 1B is a schematic block diagram of a motion estimation functional group of the example codec accelerator system of FIG. 1A, in accordance with at least some embodiments.

FIG. 1B is a schematic block diagram of a motion estimation functional group (ME 120) of example codec accelerator system 100 of FIG. 1A, in accordance with at least some embodiments. As depicted in FIG. 1B, ME 120 may include a number of functional circuit blocks that may be implemented via separate circuits. Alternatively, any (or all) of the functional circuit blocks may be implemented on an integrated circuit. For each block of the current frame, ME 120 may identify a motion vector that specifies the motion transformation of the best candidate block (inter-frame predicted candidate) in one of the reference frames into a specific block in the current frame. In some embodiments, the motion transformation may be a translation specified by a two-dimensional vector (X, Y) in units of the number of pixels X and Y along the horizontal and vertical directions. The units may be integer or fractional. In some embodiments, the motion transformation may be an affine transformation that preserves lines and parallelism but does not necessarily preserve angles or distances. An affine transformation may be specified by a combination of a translation and a matrix transformation of the coordinates.

More specifically, a full pixel search (FPS) functional circuit block 122 may identify a motion vector in terms of integer pixel values X and Y. A sub-pixel search (SPS) functional circuit block 124 may then correct the values X and Y with a fractional pixel accuracy (e.g., ¼ pixel accuracy, ⅙ pixel accuracy, ⅛ pixel accuracy, and so on). In some embodiments, FPS 122 and SPS 124 may determine the motion vector based on pixel brightness (luminance or, simply, luma) data of luma reference pixels 176-1 (e.g., stored in memory 170). The pixel color (chromaticity or, simply, chroma) data may be handled separately, as described below. The determined fractional-pixel motion vector (or, in some embodiments, an integer-pixel motion vector, if a lower resolution is sufficient) may be provided to a luma motion compensation (Luma MC) functional circuit block 126. Luma MC functional circuit block 126 may specify one or more motion compensation filters that are to be applied to the inter-frame prediction candidate block. Luma MC functional circuit block 126 may provide the determined motion vector and filter type information to RDO 130. Determining the motion vector based on luma (rather than both luma and chroma) may save an amount of computation in case the inter-frame prediction block is not selected by RDO 130.

Referring back to FIG. 1A, the information output by ME 120 (e.g., by Luma MC functional circuit block 126) may be received by RDO 130, which performs a dual function of i) performing initial intra-frame block prediction, and ii) comparing the initial intra-frame predictions with an inter-frame prediction generated by ME 120. RDO 130 may then select the best (intra- or inter-) block candidates.

In some instances, after comparison of the intra-frame with inter-frame predictions, RDO 130 may determine that an inter-frame prediction block is a winner. For example, the inter-frame prediction may have a smaller cost value characterizing a difference between the predicted block and a respective source block. In such instances, the selected inter-frame prediction winner may be returned to ME 120 for additional motion compensation filtering of the winner block's chroma pixel values. Referring again to FIG. 1B, motion vector may be provided to Chroma MC functional circuit block 128. Chroma MC functional circuit block 128 may access chroma reference pixels 176-2, identify a chroma motion compensation filter and communicate the identified filter back to RDO 130. In some embodiments, chroma data may have a reduced (compared to luma) resolution. For example, chroma values (e.g., red and blue chromaticity values, or red and green chromaticity values, or any other suitable chromaticity values) may be defined for each pair of pixels, for each 2×2 block of pixels, for each quad (4×4 block) of pixels, or according to any other suitable scheme. Motion compensation filters may be applied independently from luma filters (previously applied by ME 120) even when the winner inter-frame prediction block was determined on the basis of luma data alone. Referring back to FIG. 1A, in those instances when an inter-frame prediction block is not chosen, the motion vector may not be returned to ME 120 for chroma motion compensation as a winner intra-frame prediction block is provided to RECON 140.

Although, as described above, the motion vector determination may be based on just luma pixels, in other embodiments, the motion vector may be determined based on both luma and chroma source pixel data, with luma error, red chroma error, and blue chroma error evaluated using the same or different cost functions. The relative weights assigned to luma and chroma errors may be determined empirically, by testing. Various cost functions may be used, including a sum of absolute transformed differences (SATD), a sum of squared differences (SSD), or other suitable cost functions. For example, selection of a luma motion compensation filter and/or a chroma motion compensation filter (or both) may be performed based on the SSD cost function that characterizes a difference between luma (and/or chroma) source pixel values of the current frame and pixel values of the chosen inter-frame prediction block.

RECON 140 receives predicted blocks from RDO 130 and ME 120. Some of the received predicted blocks may be inter-frame prediction blocks identified (and motion-compensated) by ME 120. Some of the received predicted blocks may be intra-frame predicted blocks. More than one intra-frame predicted block may be received for the same region of the frame. More specifically, an initial predicted block of the first size may be received together with one or more additional candidate blocks of other sizes. If intra-frame predicted blocks are received, RECON 140 may first identify a final predicted block (from the received initial predicted block and the additional predicted blocks). Subsequently, RECON 140 performs final block reconstruction, e.g., sequentially, starting from the top-left identified block (or according to some other order, if consistent with the codec standard). Specifically, RECON 140 computes a residual block by subtracting the final predicted block from the source block of the respective size and location. Then, RECON 140 identifies and applies a discrete transform to the residual block to obtain a transformed block and finally applies a quantization transform to the transformed block. RECON 140 may include a chroma-from-luma (CFL) component 142, which determines if the chroma-from-luma intra-prediction mode should be selected for a given block, according to the techniques of the instant disclosure. If the winner block is an inter-frame prediction block, RECON 140 may perform the same operations, except no final prediction block needs to be identified (as the inter-frame prediction block becomes the final prediction block). The coding data, which includes transformed (and quantized) residual blocks, together with the identification of the final predicted blocks, is communicated to EP 160 for generation of an encoded output 178. The identification of the final predicted block may include the size of the block and the final interpolation mode (in case of the intra-frame final predicted block) or the motion vector (in case of the inter-frame final predicted block).

Similarly, RECON 140 may identify other final predicted blocks and reconstruct these blocks. Boundary pixels of reconstructed blocks become reference pixels for reconstruction of the subsequent blocks and are stored in memory 170. To match the frame that a decoder is going to obtain from the encoded output 178, reference pixels used by RECON 140 may be the pixels of the reconstructed blocks (that would also be used by the decoder). More specifically, reconstructed blocks may be obtained from the transformed and quantized residual blocks by applying a reverse quantization transform and an inverse discrete transform to obtain reconstructed residual blocks, which are then added to the final predicted blocks. The process is continued until all final predicted blocks are similarly reconstructed.

The set of the reconstructed blocks of the frame may not yet be what is intended to be displayed (on the decoder side) to a viewer. Reconstructed blocks may additionally be processed by FILTER 150 group. FILTER 150 may select from a number of filters recognized by the codec standard being used and further determine various filter parameters to enhance visual quality of the reconstructed blocks, including removal of boundary and other artifacts created during block prediction and reconstruction. In some embodiments, available filters may include a deblocking filter that removes visible block boundaries between neighboring blocks. For example, the deblocking filter may identify the value of discontinuity of luma and/or chroma values across the boundary and spread this value over a number of pixels. The extent of the spread may be among the parameters determined by FILTER 150. Additionally, FILTER 150 may apply a constrained directional enhancement filter (CDEF) to remove ringing artifacts near depictions of sharp edges of various objects. More specifically, because the quantization transform irreversibly reduces or eliminates some short-wavelength harmonics (which are important for imaging of sharp edges), CDEF may compensate for the loss of such harmonics. CDEF may identify the most likely direction of edges, e.g., by identifying lines of a constant intensity and lines of the largest intensity gradients. In some embodiments, identification of such lines may be performed by identifying and minimizing SSD for directions that best match the directional patterns of the block. After identifying the direction of the block, CDEF may sharpen the depictions of the edges in the block by choosing the filter strength along the determined direction and across this direction. FILTER 150 may also apply a loop restoration (LR) filter to the block. LR filter further improves edge quality and noise reduction using a number of filters, such as a self-guided filter, a Wiener filter, or a combination of the self-guided filter and the Wiener filter. The identified filter parameters (for deblocking, CDEF, LR filters, or other suitable filters, or any combination thereof) are then communicated to EP 160 for inclusion in the encoded output 178.

In some embodiments, to expedite generation of the encoded output 178, FILTER 150 may perform filtering of some superblocks before all blocks inside a given superblock have been reconstructed by RECON 140. For example, if a superblock has a size of 64×64 pixels, FILTER 150 may determine filter parameters based on reconstructed regions of a reduced size, e.g., 48×48 pixels, 48×56 pixels, 48×54 pixels, 52×56 pixels, or some other regions of a reduced size. The regions of the reduced size may be located fully inside a corresponding superblock or may be touching at least one boundary of the superblock. The size of the reduced region may be dynamic, e.g., determined by the sizes of the reconstructed blocks inside the superblocks.

The output of FILTER 150 includes information that is sufficient for a decoder to reproduce the image frame (as well as multiple previous and subsequent frames), including identification of various inter-prediction and intra-prediction blocks, sizes, and interpolation modes for these blocks, identification of discrete transforms used to encode the blocks, identification of filters used to improve the visual quality of the blocks, and the like. The output of FILTER 150 may be provided to EP 160 for entropy encoding. Specifically, EP 160 may replace each fixed-length input symbol with a variable-length prefix-free output codeword. The length of each codeword may be approximately proportional to the negative logarithm of the probability of occurrence of the codeword so that the most common symbols are represented by the shortest codes. Various coding techniques may be used by EP 160, including Huffman coding and arithmetic coding. The encoded output 178 may be stored in memory 170 and/or livestreamed over the Internet or any other suitable network, including a local area network, a wide area network, a personal area network, a public network, a private network, and the like.

In some embodiments, functionality described above is performed by circuit blocks. In another embodiment, some of the functionality (of one or more circuit groups 120-160) may be implemented in one or more software or firmware modules executed by a processing device, e.g., a central processing unit (CPU), a graphics processing unit (GPU), a field-programmable gate array (FPGA), an application-specific integrated circuit (ASIC), or some other suitable logic device. For example, a first software/firmware module may implement functionality of FILTER 150 and/or a second software/firmware module may implement functionality of EP 160, whereas ME 120, RDO 130, and RECON 140 are implemented via dedicated functional circuit groups. In some embodiments, all of ME 120, RDO 130, RECON 140, FILTER 150, and EP 160 may be implemented as software/firmware modules.

Figure 2:
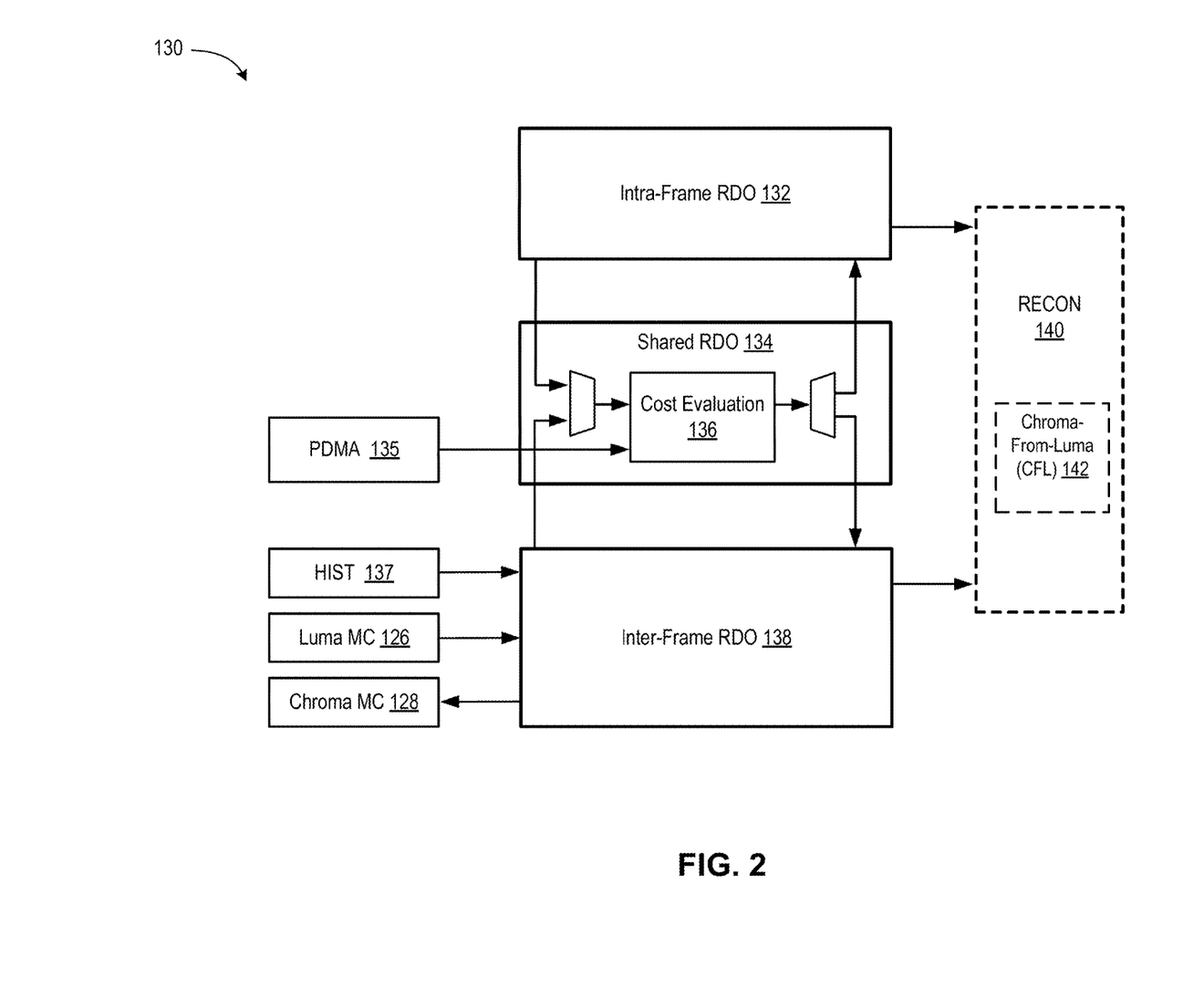
FIG. 2 is a schematic block diagram of a rate-distortion optimization functional group, in accordance with at least some embodiments.

FIG. 2 is a schematic block diagram of a rate-distortion optimization (RDO) functional group, in accordance with at least some embodiments. RDO depicted in FIG. 2 may be RDO 130 of example codec accelerator system 100 of FIG. 1A. As depicted in FIG. 2, RDO 130 may include a number of functional circuit blocks that may be implemented via the same or separate circuits. The functional circuit blocks may include an intra-frame RDO functional circuit block 132, a shared RDO functional circuit block 134, and an inter-frame RDO functional circuit block 138. Intra-frame RDO functional circuit block 132 may apply, using reference pixels, various interpolation modes to a given block of the current image and provide an indication of the predicted block (e.g., interpolated pixel values) to shared RDO functional circuit block 134 for cost evaluation 136. Shared RDO functional circuit block 134 may use peripheral direct memory access controller (PDMA) 135 to access source pixels of the current frame. Cost evaluation 136 may use one or more cost functions (e.g., SATD, SSD, or any other suitable cost function) to evaluate a difference between pixels of the predicted block with pixels of the corresponding source block. Shared RDO 134 may then provide the determined cost value back to intra-frame RDO functional circuit block 132, which may select one or more lowest-cost interpolation modes for further processing by RECON 140 and/or CFL component 142.

Inter-frame RDO functional circuit block 138 may use historical data module (HIST) 137 that collects data from previously processed inter-frame prediction blocks for reuse during processing of subsequent blocks (e.g., neighbor blocks). Inter-frame RDO functional circuit block 138 may obtain a motion vector from Luma MC 126 and generate a representation (e.g., pixel values) for the inter-frame predicted block based on the received motion vector. The generated representation may be sent to shared RDO functional circuit block 134 for cost evaluation 136. Shared RDO functional circuit block 134 may use PDMA 135 to access source pixels of the current frame and one or more reference frames. Cost evaluation 136 may evaluate a difference between pixels of the inter-frame predicted block with pixels of the corresponding source block. Shared RDO functional circuit block 134 may then provide the determined cost value back to inter-frame RDO functional circuit block 138. Shared RDO functional circuit block 134 may further perform selection, based on the determined costs, between inter-frame and intra-frame predicted blocks. The winners (the lowest-cost predicted blocks) are then provided for further processing by RECON 140 and/or CFL component 142.

Inter-frame RDO functional circuit block 138 may further select a type of a discrete transform to be applied to a difference of pixel values in the selected inter-frame predicted block and the corresponding source pixels of the current frame. The selection may be performed by cost evaluation 136 and may be based on any suitable cost function (e.g., SSD, SATD, etc.). The discrete transform may be invertible and may include Discrete Fourier Transform, Discrete Cosine Transform (DCT), Horizontal DCT, Vertical DCT, Asymmetric Discrete Sine (ADS) Transform, Flipped ADS Transform, Identity Transform (e.g., for imaging of sharp transitions/edges), or any other suitable discrete transform.

Figure 3:
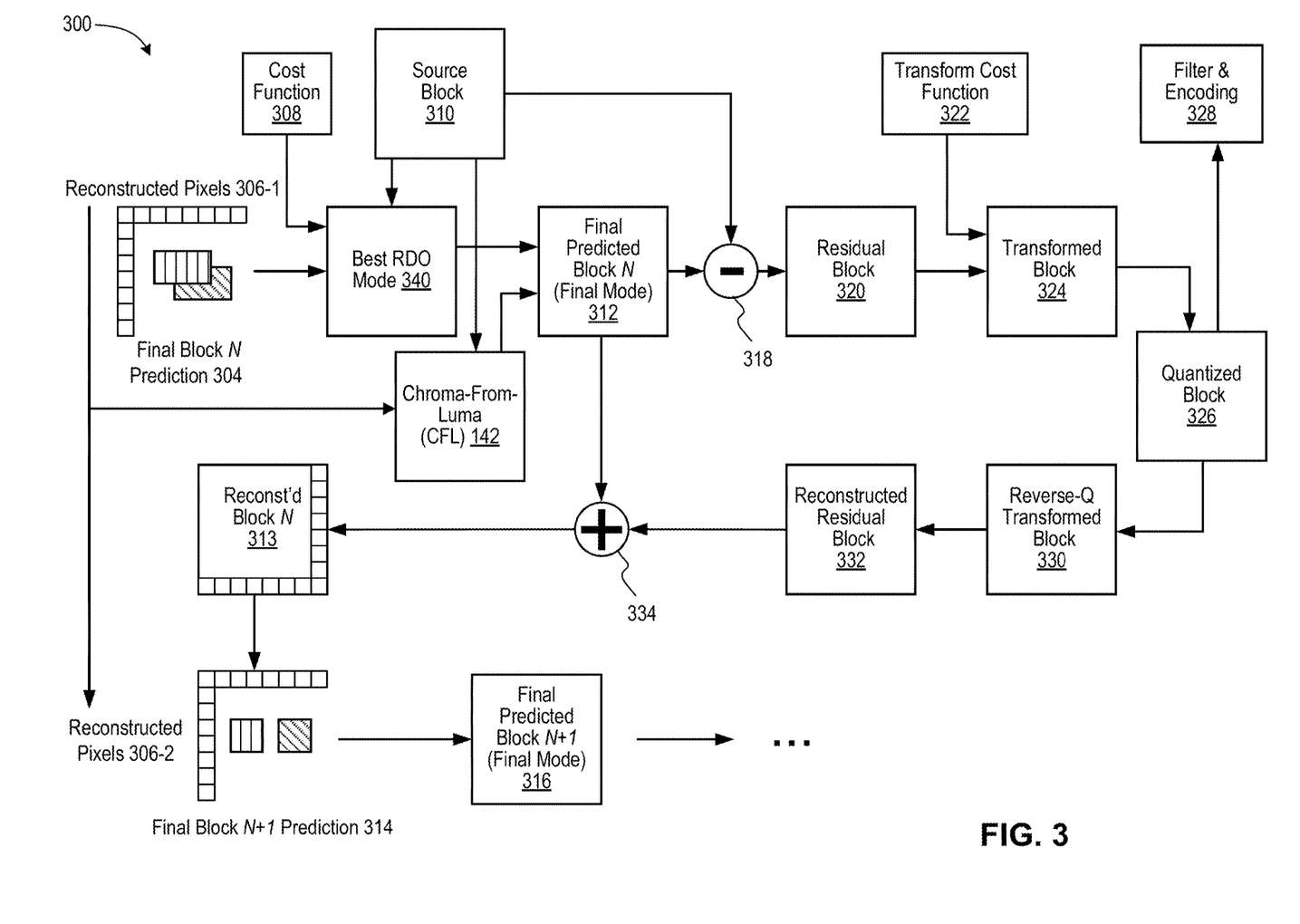
FIG. 3 is a schematic diagram depicting operations of predicting, transforming, and quantizing of pixel data in advanced codecs, in accordance with at least some embodiments.

FIG. 3 is a schematic diagram depicting operations 300 of predicting, transforming, and quantizing of pixel data in advanced codecs, in accordance with at least some embodiments. In some embodiments, operations 300 depicted in FIG. 3 may be performed by RECON 140 of example codec accelerator system 100 of FIG. 1. In some embodiments, operations 300 depicted in FIG. 3 may be performed by a general CPU(s) or GPU(s) based on instructions generated by a software or a firmware codec application. For example, after codec accelerator system 100 has identified top M candidate modes (each associated with a particular predicted block also referred herein to as a candidate block) for each block of the current image, those modes that have not been eliminated in favor of inter-frame prediction candidates may undergo operations 300. As depicted schematically in FIG. 3, final prediction of a block N 304 may be performed using reconstructed (reference) pixels 306-1, which may include some of the reconstructed pixels determined in the course of reconstruction of preceding final blocks 1 . . . . N−1. In some embodiments, the identified top M candidate modes may be intra-frame prediction modes for chroma values of the block N.

Reconstructed pixels 306-1 may include pixels that are on the left/top side of the block N (or other suitable reference pixels, as may be specified by the codec standard). Reconstructed pixels 306-1 may include luma pixel values and/or chroma pixel values of neighboring blocks. Reconstructed pixels 306-1 may also include reconstructed luma pixel values of block N. Various candidate modes may be selected using a cost function 308. In some embodiments, cost function 308 may be SATD-based cost function, SSD-based cost function, or some other suitable cost function. Cost function 308 may be used to compare (e.g., pixel-by-pixel) a final block candidate computed using a given candidate mode with a respective source block 310 of the current frame. Although source block 310 is depicted as a square, a rectangular source block of the corresponding size may be used for reconstruction if block N is rectangular. Based on the results of the comparison, a best RDO mode 340 may be selected for block N.

CFL component 142 may calculate a cost for the CFL intra-frame prediction mode to determine if the CFL intra-prediction mode is better than best RDO mode 340. The cost of the CFL intra-prediction mode may be calculated by comparing (e.g., pixel-by-pixel) predicted pixels for the mode to source pixels of the video frame that is being encoded using a cost function. To avoid reconstruction of the predicted pixels and the associated computations, the cost function may be an SATD-based function (e.g., sum of absolute Hadamard-transformed differences function) instead of a function based on a sum of squared errors (SSE) function.

The predicted pixel values CP for the CFL intra-prediction mode can be generated using the following formula:

$$C^p = \alpha * L^r + \beta$$

where α is an alpha value determined by CFL component 142, β is a "DC" prediction calculated using neighboring reconstructed chroma values, and L' is the reconstructed luma values for the block. For example, CFL component 142 may receive reconstructed pixels 306-1, including reconstructed luma pixel values for block N. If there are more luma pixel values than expected chroma values (e.g., because the video frame has a subsampling scheme), the reconstructed luma pixel values may be subsampled to match the resolution of the expected chroma values (e.g., from 4 luma values for every 4 pixels to 2 chroma values for every 4 pixels, or the like). In some embodiments, an average luma value of the subsampled luma values may be calculated and subtracted from the subsampled values to obtain L' ("AC" contribution).

The "DC" prediction β may be determined based on the position of block N and which neighboring chroma pixels are available in reconstructed pixels 306-1. For example, if reconstructed chroma values of a block to the left of block N and to the top of block N are available, β may be given by the following equation:

$$\beta = \frac{1}{W+H}\left(\sum \text{left} + \sum \text{top} + ((W+H) \gg 1)\right)$$

where W is the width of block N, H is the height of block N, Σ left is the sum of the pixels along the left boundary of block N, and Σ top is the sum of the pixels along the top boundary of block N.

If reconstructed chroma values of only a block to the left of block N are available, β may be given by the following equation:

$$\beta = \frac{1}{W}\left(\sum \text{left} + (W \gg 1)\right)$$

If reconstructed chroma values of only a block to the top of block N are available, β may be given by the following equation:

$$\beta = \frac{1}{H}\left(\sum \text{top} + (H \gg 1)\right)$$

CFL component 142 may calculate prediction pixels for one or more alpha values using the computed L'' and β from above. The codec being used for the encoding may define a valid range of alpha values (e.g., from −16 to 16 inclusive). In some embodiments, CFL component 142 may calculate prediction pixels for only a subset of possible alpha values (e.g., alpha values from −2 to 2 inclusive). Each block of predicted pixels may be compared to a corresponding block of source pixels (e.g., received from source block 310) to obtain a cost for the alpha value. In some embodiments, the predicted pixels for each alpha value and/or the associated cost may be calculated in parallel. The alpha value with the lowest associated cost may be selected by CFL component 142.

In some embodiments, CFL component 142 may evaluate alpha values, generate prediction pixels, and calculate associated costs for a first chroma component (e.g., U/Cb, V/Cr) and then may evaluate alpha values, generate prediction pixels, and calculate associated costs for a second chroma component. The selected alpha value for the first chroma component may be different from the selected alpha value for the second chroma component. A final cost for the CFL intra-prediction mode may be calculated by combining the cost associated with the first selected alpha value and the cost associated with the second selected alpha value. Final predicted block N (final mode) 312 may be generated using the intra-prediction mode (e.g., either best RDO mode 340 or CFL intra-prediction mode) with the lowest cost. In some embodiments, CFL intra-prediction mode may not be selected if the best alpha value for each chroma component is zero. In some embodiments, if best RDO mode 340 is not the DC intra-frame prediction mode, a cost for the DC intra-frame prediction mode may be calculated and may be compared to the other intra-prediction modes during selection of the mode with the lowest cost.

Subsequently, RECON 140 (or any other suitable device performing operations 300) performs a final block reconstruction, e.g., starting from the top-left block (or in some other order recognized by the codec standard). Specifically, final predicted block N (final mode) 312 may be subtracted (operation 318) from the corresponding source block 310 of the respective size and location. Subtraction is performed pixel-by-pixel and a residual block 320 is obtained, Δ (x, y)=Source (x, y)−Pred. Block (x, y). Subsequently, RECON 140 (or another suitable component) selects and performs a discrete transform of the residual block 320. Discrete transforms may be invertible and may include Discrete Fourier Transform, Discrete Cosine Transform (DCT), Horizontal DCT, Vertical DCT, Asymmetric Discrete Sine (ADS) Transform, Flipped ADS Transform, Identity Transform (e.g., for imaging of sharp transitions/edges), or any other suitable discrete transform. Transforms may be selected using a transform cost function 322. The selected transform is used to produce a transformed (residual) block 324, Δ(x, y)→Δ($k_x$, $k_y$). Subsequently, a (forward) quantization transform may be applied to transformed block 324 to obtain quantized block 326, Δ($k_x$, $k_y$)=>Δ($k_x$, $k_y$). The quantization transform can be irreversible and, in some embodiments, may include dividing the transformed block 324 (element-by-element) by a table of quantization coefficients with a subsequent rounding operation applied to the result of the division operation. As a consequence, small components of the transformed block 324 may turn to zero, such that the quantized block 326 includes fewer (in some instances much fewer) nonzero elements than the transformed block 324.

The quantized block, together with other coding data may be provided for filtering and encoding (328), e.g., by FILTER 150 and EP 160 of example code accelerator system 100 of FIG. 1A. The other coding data may include the identification of the final predicted block including the size and the location of the block, the identification of the type of the prediction used (inter-frame or intra-frame), the motion vector and the motion compensation filters (for inter-frame predictions), the final interpolation mode (for intra-frame predictions), the type of the discrete transform being used, the identification of the table of quantization coefficients, and various other data.

The quantized block 326 $\Delta_Q(k_x, k_y)$ may then be used to obtain a reconstructed block N 313. RECON 140 (or some other device performing operations 300) may perform a reverse quantization transform to obtain a reverse-quantized transformed block 330. The reverse quantization transform may include multiplying quantized block 326 (e.g., element-by-element) by the table of quantization coefficients. Because of the rounding performed during the forward quantization transform, the reverse-quantized transformed block 330, $\Delta'^{(k_x,k_y)}$, does not in general coincide with the transformed block 324, $\Delta'^{(k_x,k_y)}$. Application of the inverse discrete transform to the reverse-quantized transformed block 330, $\Delta'^{(k_x,k_y)} \rightarrow \Delta'^{(x,y)}$, therefore, generates a reconstructed residual block 332. $\Delta'^{(x,y)}$, that is different from the residual block 320, $\Delta(x, y)$. Reconstructed residual block 332 may then be added (operation 334) to the final predicted block N (final mode) 312 to obtain reconstructed block N 313, e.g., as follows, Recon. Block (x, y)=Pred. Block (x, y)+$\Delta'^{(x,y)}$.

Some of the boundary pixels of reconstructed block N 313 become reference pixels for reconstruction of the subsequent blocks. For example, a subset of pixels of the reconstructed block N 313 (e.g., the bottom row and the rightmost column of the reconstructed block) may be used as reconstructed (reference) pixels 306-2 for a final block N+1 prediction 314. The final predicted block N+1 316 may be processed similarly to processing of block N. The described process may be continued until the entire frame is reconstructed.

Figure 4:
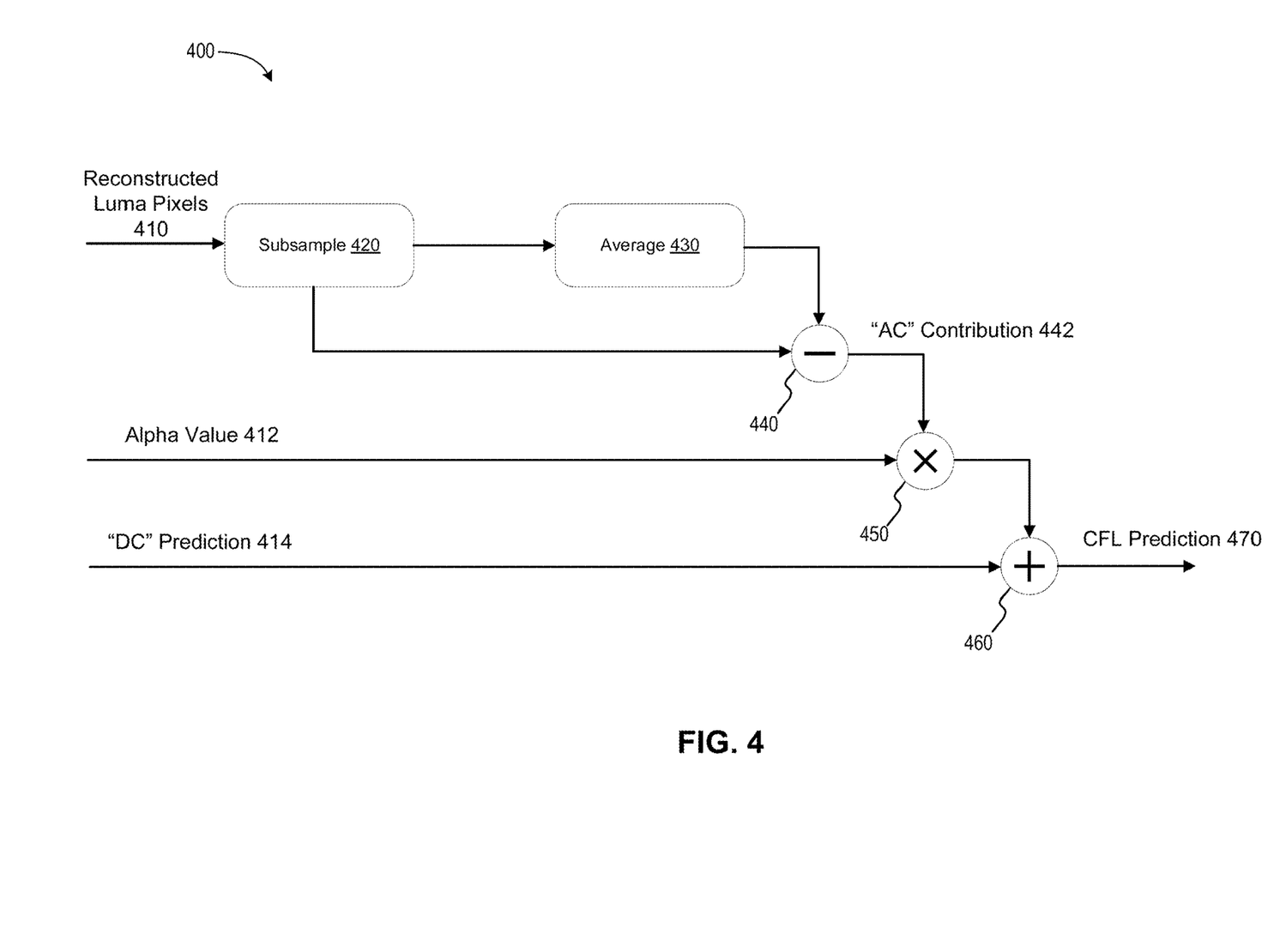
FIG. 4 illustrates schematically operations of predicting chroma values using luma values, in accordance with at least some embodiments.

FIG. 4 illustrates schematically operations 400 of predicting chroma values using luma values, in accordance with at least some embodiments. In some embodiments, operations 400 depicted in FIG. 4 may be performed by CFL component 142 of example codec accelerator system 100 of FIG. 1. Reconstructed luma pixels 410 may be received for a block. Subsample operation 420 may convert reconstructed luma pixels 410 from a first resolution corresponding to the luma pixel resolution to a second resolution corresponding to the chroma pixel resolution. Average operation 430 may calculate an average luma pixel value of the subsampled reconstructed luma pixels. "AC" contribution 442 may be obtained by subtracting (operation 440) the average luma pixel value from each pixel value of the subsampled reconstructed luma pixels. "AC" contribution 442 may then be multiplied (operation 450) by alpha value 412. Alpha value 412 may be an integer between −16 and 16, inclusive. In some embodiments, alpha value 412 may be an integer between −2 and 2, inclusive. The resulting product may be added (operation 460) to "DC" prediction 414 to obtain CFL prediction 470. "DC" prediction 414 may be generated based on reconstructed chroma values of neighboring blocks. For example, during generation of chroma values (e.g., CFL prediction 470) for a first chroma component (e.g., U/Cb) of a block, "DC" prediction 414 may be calculated using values of the first chroma component of reconstructed pixels of a left neighboring block and/or a top neighboring block. The pixel values of CFL prediction 470 may be compared to source pixels of a corresponding block, and a cost of alpha value 412 may be calculated using a SATD-based cost function.

Figure 5:
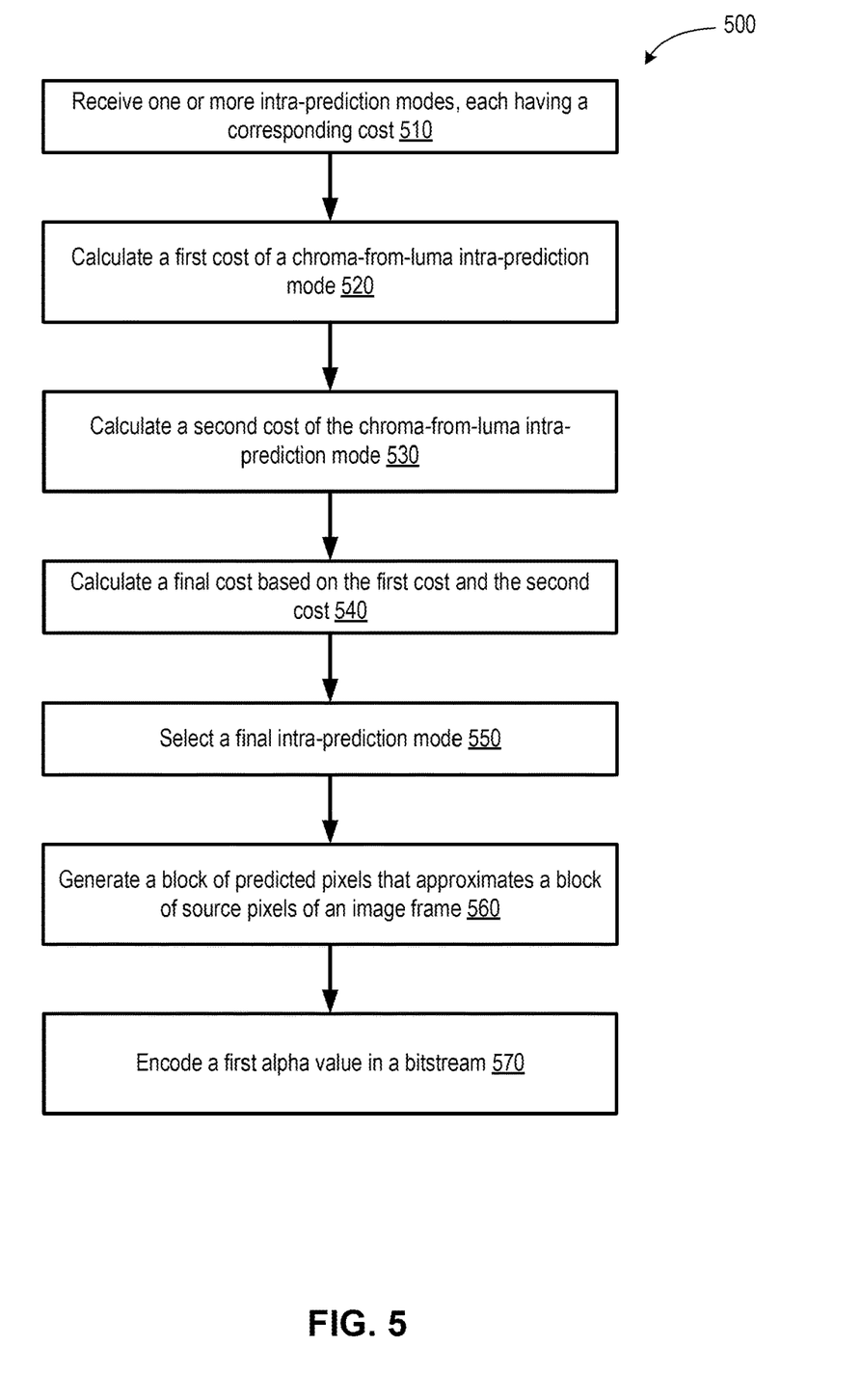
FIG. 5 is a flow diagram of an example method of optimizing a video frame encoding using a chroma-from-luma intra-prediction mode, in accordance with at least some embodiments.
Figure 6:
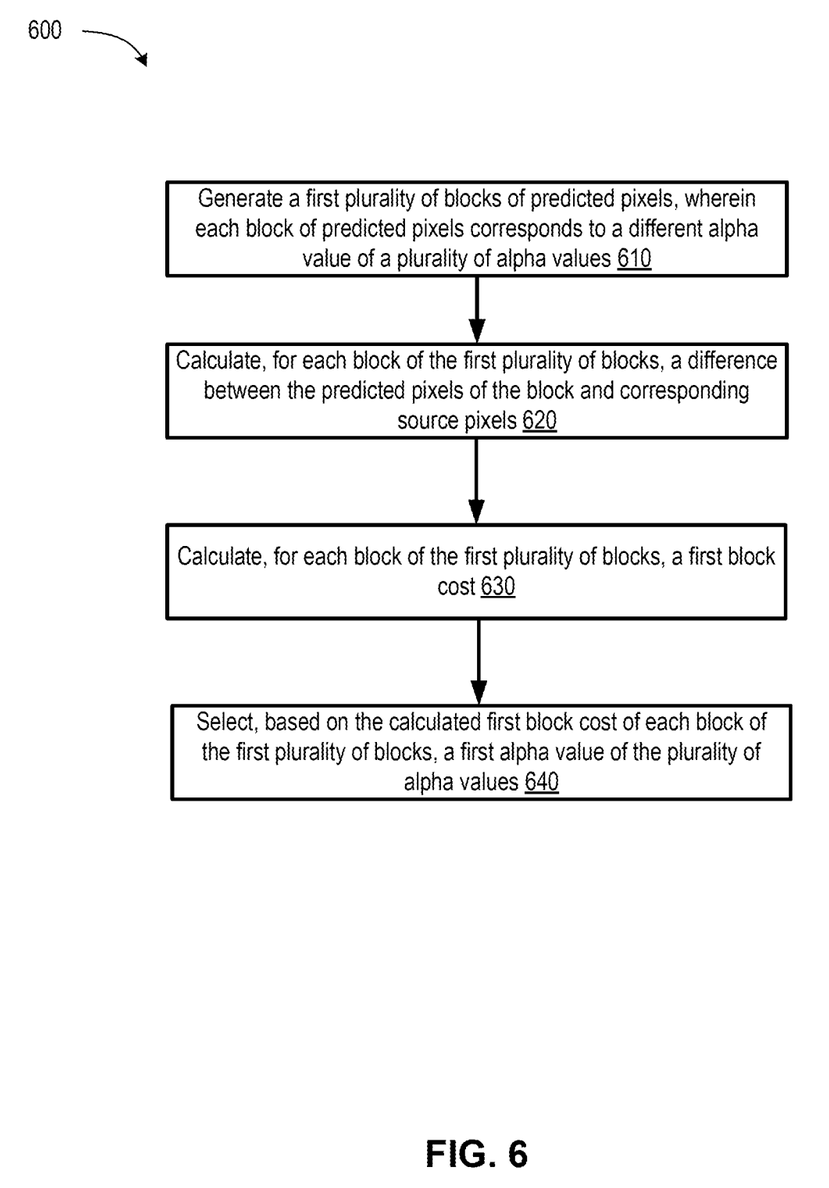
FIG. 6 is a flow diagram of an example method of selecting an alpha value for a chroma-from-luma intra-prediction mode, in accordance with at least some embodiments.

FIG. 5 and FIG. 6 are flow diagrams of example methods 500 and 600 of optimizing a video frame encoding using a chroma-from-luma intra-prediction mode, in accordance with at least some embodiments. In some embodiments, methods 500 and 600 may be performed by example codec accelerator system 100 of FIG. 1A. In some embodiments, methods 500 and 600 may be performed by one or more circuits that may communicate with one or more memory devices. In some embodiments, at least some operations of methods 500 and 600 may be performed by multiple (e.g., parallel) hardware threads, each thread executing one or more individual functions, routines, subroutines, or operations of the methods. In some embodiments, processing threads implementing methods 500 and 600 may be synchronized (e.g., using semaphores, critical sections, and/or other thread synchronization mechanisms). Alternatively, hardware threads implementing methods 500 and 600 may be executed asynchronously with respect to each other. Various operations of methods 500 and 600 may be performed in a different order compared with the order shown in FIG. 5 and FIG. 6. Some operations of methods 500 and 600 may be performed concurrently with other operations. In some embodiments, one or more operations shown in FIG. 5 and FIG. 6 may not be performed.

FIG. 5 is a flow diagram of an example method 500 of optimizing a video frame encoding using a chroma-from-luma intra-prediction mode, in accordance with at least some embodiments. Method 500 may be performed to encode a video file in AV1 codec format or any other suitable video codec format that supports a chroma-from-luma intra-prediction mode. At block 510, one or more circuits performing method 500 may receive one or more intra-prediction modes, each having a corresponding cost. The one or more intra-prediction modes may include a DC intra-prediction mode and/or one or more directional intra-prediction modes. At block 520, the one or more circuits may calculate, for a first chroma component, a first cost of a chroma-from-luma intra-prediction mode. The first chroma component may be the U/Cb chroma component or may be the V/Cr chroma component. At block 530, the one or more circuits may calculate a second cost of the chroma-from-luma intra-prediction mode.

At block 540, the one or more circuits may calculate a final cost based on the first cost and the second cost. For example, the final cost may be a summation of the first cost and the second cost. In some embodiments, the final cost may be a linear combination of the first cost and the second cost. At block 550, the one or more circuits may select, based on each corresponding cost of the one or more intra-prediction modes and the final cost, a final intra-prediction mode. The final intra-prediction mode may correspond to the intra-prediction mode with the lowest cost. At block 560, the one or more circuits may generate, based on the selected final intra-prediction mode, a block of predicted pixels that approximates a block of source pixels of an image frame. At block 570, the one or more circuits may encode a first alpha value in a bitstream. The first alpha value may correspond to the chroma-from-luma intra-prediction mode.

FIG. 6 is a flow diagram of an example method of selecting an alpha value for a chroma-from-luma intra-prediction mode, in accordance with at least some embodiments. In some embodiments, method 600 may be performed as part of block 520 of method 500. Method 600 may be performed separately (e.g., in parallel) for various blocks and/or alpha values. More specifically, at block 610, one or more circuits performing method 600 may generate a first plurality of blocks of predicted pixels, wherein each block of predicted pixels corresponds to a different alpha value of a plurality of alpha values. At block 620, the one or more circuits may calculate, for each block of the first plurality of blocks, a difference between the predicted pixels of the block and corresponding source pixels. At block 630, the one or more circuits may calculate, for each block of the first plurality of blocks, a first block cost. In some embodiments, the first block cost is calculated using a SATD-based cost function applied to the calculated difference between the predicted pixels and the corresponding source pixels. At block 640, the one or more circuits may select, based on the calculated first block cost of each block of the first plurality of blocks, a first alpha value of the plurality of alpha values. The selected first alpha value may correspond to the alpha value encoded in bitstream at block 570 of method 500.

Images and videos generated applying one or more of the techniques disclosed herein may be displayed on a monitor or other display device. In some embodiments, the display device may be coupled directly to the system or processor generating or rendering the images or videos. In other embodiments, the display device may be coupled indirectly to the system or processor, such as via a network. Examples of such networks include the Internet, mobile telecommunications networks, a WIFI network, as well as any other wired and/or wireless networking system. When the display device is indirectly coupled, the images or videos generated by the system or processor may be streamed over the network to the display device. Such streaming allows, for example, video games or other applications, which render images or videos, to be executed on a server or in a data center and the rendered images and videos to be transmitted and displayed on one or more user devices (such as a computer, video game console, smartphone, other mobile devices, etc.) that are physically separate from the server or data center. Hence, the techniques disclosed herein can be applied to enhance the images or videos that are streamed and to enhance services that stream images and videos, such as NVIDIA GeForce Now (GFN), Google Stadia, and the like.

Furthermore, images and videos generated applying one or more of the techniques disclosed herein may be used to train, test, or certify deep neural networks (DNNs) used to recognize objects and environments in the real world. Such images and videos may include scenes of roadways, factories, buildings, urban settings, rural settings, humans, animals, and any other physical object or real-world setting. Such images and videos may be used to train, test, or certify DNNs that are employed in machines or robots to manipulate, handle, or modify physical objects in the real world. Furthermore, such images and videos may be used to train, test, or certify DNNs that are employed in autonomous vehicles to navigate and move the vehicles through the real world. Additionally, images and videos generated applying one or more of the techniques disclosed herein may be used to convey information to users of such machines, robots, and vehicles.

Other variations are within spirit of present disclosure. Thus, while disclosed techniques are susceptible to various modifications and alternative constructions, certain illustrated embodiments thereof are shown in drawings and have been described above in detail. It should be understood, however, that there is no intention to limit disclosure to specific form or forms disclosed, but on contrary, intention is to cover all modifications, alternative constructions, and equivalents falling within spirit and scope of disclosure, as defined in appended claims.

Use of terms "a" and "an" and "the" and similar referents in context of describing disclosed embodiments (especially in context of following claims) are to be construed to cover both singular and plural, unless otherwise indicated herein or clearly contradicted by context, and not as a definition of a term. Terms "comprising," "having," "including," and "containing" are to be construed as open-ended terms (meaning "including, but not limited to,") unless otherwise noted. "Connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within range, unless otherwise indicated herein and each separate value is incorporated into specification as if it were individually recited herein. In at least one embodiment, use of term "set" (e.g., "a set of items") or "subset" unless otherwise noted or contradicted by context, is to be construed as a nonempty collection comprising one or more members. Further, unless otherwise noted or contradicted by context, term "subset" of a corresponding set does not necessarily denote a proper subset of corresponding set, but subset and corresponding set may be equal.

Conjunctive language, such as phrases of form "at least one of A, B, and C," or "at least one of A, B and C," unless specifically stated otherwise or otherwise clearly contradicted by context, is otherwise understood with context as used in general to present that an item, term, etc., may be either A or B or C, or any nonempty subset of set of A and B and C. For instance, in an illustrative example of a set having three members, conjunctive phrases "at least one of A, B, and C" and "at least one of A, B and C" refer to any of following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present. In addition, unless otherwise noted or contradicted by context, the term "plurality" indicates a state of being plural (e.g., "a plurality of items" indicates multiple items). In at least one embodiment, the number of items in a plurality is at least two, but it can be more when so indicated either explicitly or by context. Further, unless stated otherwise or otherwise clear from context, the phrase "based on" means "based at least in part on" and not "based solely on."

Operations of processes described herein can be performed in any suitable order unless otherwise indicated herein or otherwise clearly contradicted by context. In at least one embodiment, a process such as those processes described herein (or variations and/or combinations thereof) is performed under the control of one or more computer systems configured with executable instructions and is implemented as code (e.g., executable instructions, one or more computer programs or one or more applications) executing collectively on one or more processors, by hardware or combinations thereof. In at least one embodiment, code is stored on a computer-readable storage medium, for example, in form of a computer program comprising a plurality of instructions executable by one or more processors. In at least one embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In at least one embodiment, code (e.g., executable code or source code) is stored on a set of one or more non-transitory computer-readable storage media having stored thereon executable instructions (or other memory to store executable instructions) that, when executed (i.e., as a result of being executed) by one or more processors of a computer system, cause the computer system to perform operations described herein. In at least one embodiment, a set of non-transitory computer-readable storage media comprises multiple non-transitory computer-readable storage media and one or more of individual non-transitory storage media of multiple non-transitory computer-readable storage media lack all of code, while multiple non-transitory computer-readable storage media collectively store all of code. In at least one embodiment, executable instructions are executed such that different instructions are executed by different processors—for example, a non-transitory computer-readable storage medium stores instructions, and a main central processing unit ("CPU") executes some of the instructions while a graphics processing unit ("GPU") executes other instructions. In at least one embodiment, different components of a computer system have separate processors, and different processors execute different subsets of instructions.

Accordingly, in at least one embodiment, computer systems are configured to implement one or more services that singly or collectively perform operations of processes described herein, and such computer systems are configured with applicable hardware and/or software that enable the performance of operations. Further, a computer system that implements at least one embodiment of present disclosure is a single device and, in another embodiment, is a distributed computer system comprising multiple devices that operate differently such that distributed computer system performs operations described herein and such that a single device does not perform all operations.

Use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

All references, including publications, patent applications, and patents, cited herein are hereby incorporated by reference to the same extent as if each reference were individually and specifically indicated to be incorporated by reference and were set forth in its entirety herein.

In description and claims, the terms "coupled" and "connected," along with their derivatives, may be used. It should be understood that these terms may not be intended as synonyms for each other. Rather, in particular examples, "connected" or "coupled" may be used to indicate that two or more elements are in direct or indirect physical or electrical contact with each other. "Coupled" may also mean that two or more elements are not in direct contact with each other but yet still co-operate or interact with each other.

Unless specifically stated otherwise, it may be appreciated that throughout specification terms such as "processing," "computing," "calculating," "determining," or like, refer to actions and/or processes of a computer or computing system, or similar electronic computing device, that manipulate and/or transform data represented as physical, such as electronic, quantities within computing system's registers and/or memories into other data similarly represented as physical quantities within computing system's memories, registers or other such information storage, transmission or display devices.

In a similar manner, the term "processor" may refer to any device or portion of a device that processes electronic data from registers and/or memory and transform that electronic data into other electronic data that may be stored in registers and/or memory. As non-limiting examples, a "processor" may be a CPU or a GPU. A "computing platform" may comprise one or more processors. As used herein, "software" processes may include, for example, software and/or hardware entities that perform work over time, such as tasks, threads, and intelligent agents. Also, each process may refer to multiple processes, for carrying out instructions in sequence or in parallel, continuously or intermittently. In at least one embodiment, the terms "system" and "method" are used herein interchangeably insofar as the system may embody one or more methods, and methods may be considered a system.

In the present document, references may be made to obtaining, acquiring, receiving, or inputting analog or digital data into a subsystem, computer system, or computer-implemented machine. In at least one embodiment, the process of obtaining, acquiring, receiving, or inputting analog and digital data can be accomplished in a variety of ways, such as by receiving data as a parameter of a function call or a call to an application programming interface. In at least one embodiment, processes of obtaining, acquiring, receiving, or inputting analog or digital data can be accomplished by transferring data via a serial or parallel interface. In at least one embodiment, processes of obtaining, acquiring, receiving, or inputting analog or digital data can be accomplished by transferring data via a computer network from providing entity to acquiring entity. In at least one embodiment, references may also be made to providing, outputting, transmitting, sending, or presenting analog or digital data. In various examples, processes of providing, outputting, transmitting, sending, or presenting analog or digital data can be accomplished by transferring data as an input or output parameter of a function call, a parameter of an application programming interface, or an interprocess communication mechanism.

Although descriptions herein set forth example embodiments of described techniques, other architectures may be used to implement described functionality and are intended to be within the scope of this disclosure. Furthermore, although specific distributions of responsibilities may be defined above for purposes of description, various functions and responsibilities might be distributed and divided in different ways, depending on the circumstances.

Furthermore, although the subject matter has been described in language specific to structural features and/or methodological acts, it is to be understood that the subject matter claimed in appended claims is not necessarily limited to specific features or acts described. Rather, specific features and acts are disclosed as exemplary forms of implementing the claims.

What is claimed is:

1. A method comprising:
   receiving one or more intra-prediction modes, each having a corresponding cost;
   calculating, for a first chroma component, a first cost of a chroma-from-luma intra-prediction mode, wherein calculating the first cost comprises:
      generating a first plurality of blocks of predicted pixels, wherein each block of predicted pixels corresponds to a different alpha value of a plurality of alpha values;
      calculating, for each block of the first plurality of blocks, a difference between the predicted pixels of the block and corresponding source pixels;
      calculating, for each block of the first plurality of blocks, a first block cost; and
      selecting, based on the calculated first block cost of each block of the first plurality of blocks, a first alpha value of the plurality of alpha values; and
   calculating, for a second chroma component, a second cost of the chroma-from-luma intra-prediction mode;
   calculating a final cost based on the first cost and the second cost;
   selecting, based on each corresponding cost of the one or more intra-prediction modes and the final cost, a final intra-prediction mode;
   generating, based on the selected final intra-prediction mode, a block of predicted pixels that approximates a block of source pixels of an image frame; and
   encoding the selected first alpha value in a bitstream.

2. The method of claim 1, wherein calculating the second cost comprises:
   generating a second plurality of blocks of predicted pixels, wherein each block of predicted pixels corresponds to a different alpha value of a plurality of alpha values;

calculating, for each block of the second plurality of blocks, a difference between the predicted pixels of the block and corresponding source pixels;

calculating, for each block of the second plurality of blocks, a second block cost; and selecting, based on the calculated second block cost of each block of the second plurality of blocks, a second alpha value of the plurality of alpha values.

3. The method of claim 2, further comprising encoding the selected second alpha value in the bitstream, wherein the selected first alpha value and the selected second alpha value are not both zero.

4. The method of claim 1, wherein calculating the first block cost comprises calculating a sum of absolute Hadamard-transformed differences based on the calculated difference.

5. The method of claim 1, wherein the one or more intra-prediction modes comprises at least a DC intra-prediction mode.

6. The method of claim 1, wherein generating the first plurality of blocks of predicted pixels is performed in parallel.

7. The method of claim 1, wherein generating the first plurality of blocks of predicted pixels comprises, for at least a first block:
obtaining reconstructed luma pixels;
subtracting an average luma value from the reconstructed luma pixels to get an AC contribution; and
combining the AC contribution with chroma pixels of a neighboring block based on the alpha value corresponding to the first block.

8. The method of claim 1, wherein the plurality of alpha values comprises values between negative two (−2) and two (2) inclusive.

9. A system comprising:
a memory device; and
one or more circuit groups communicatively coupled to the memory device, the one or more circuit groups to:
receive one or more intra-prediction modes, each having a corresponding cost;
calculate, for a first chroma component, a first cost of a chroma-from-luma intra-prediction mode, wherein to calculate the first cost, the one or more circuit groups are to:
generate a first plurality of blocks of predicted pixels, wherein each block of predicted pixels corresponds to a different alpha value of a plurality of alpha values;
calculate, for each block of the first plurality of blocks, a difference between the predicted pixels of the block and corresponding source pixels;
calculate, for each block of the first plurality of blocks, a first block cost; and
select, based on the calculated first block cost of each block of the first plurality of blocks, a first alpha value of the plurality of alpha values; and
calculate, for a second chroma component, a second cost of the chroma-from-luma intra-prediction mode;
calculate a final cost based on the first cost and the second cost;
select, based on each corresponding cost of the one or more intra-prediction modes and the final cost, a final intra-prediction mode;
generate, based on the selected final intra-prediction mode, a block of predicted pixels that approximates a block of source pixels of an image frame; and
encoding the selected first alpha value in a bitstream.

10. The system of claim 9, wherein to calculate the second cost, the one or more circuit groups are further to:
generate a second plurality of blocks of predicted pixels, wherein each block of predicted pixels corresponds to a different alpha value of a plurality of alpha values;
calculate, for each block of the second plurality of blocks, a difference between the predicted pixels of the block and corresponding source pixels;
calculate, for each block of the second plurality of blocks, a second block cost; and
select, based on the calculated second block cost of each block of the second plurality of blocks, a second alpha value of the plurality of alpha values.

11. The system of claim 10, wherein the one or more circuit groups are further to encode the selected second alpha value in the bitstream, wherein the selected first alpha value and the selected second alpha value are not both zero.

12. The system of claim 9, wherein to calculate the first block cost, the one or more circuit groups are to calculate a sum of absolute Hadamard-transformed differences based on the calculated difference.

13. The system of claim 9, wherein the one or more intra-prediction modes comprises at least a DC intra-prediction mode.

14. The system of claim 9, wherein the one or more circuit groups generates the first plurality of blocks of predicted pixels in parallel.

15. The system of claim 9, wherein to generate the first plurality of blocks of predicted pixels, the one or more circuit groups are to, for at least a first block:
obtain reconstructed luma pixels;
subtract an average luma value from the reconstructed luma pixels to get an AC contribution; and
combine the AC contribution with chroma pixels of a neighboring block based on the alpha value corresponding to the first block.

16. The system of claim 9, wherein the plurality of alpha values comprises values between negative two (−2) and two (2) inclusive.

17. A system comprising:
a memory device; and
a plurality of circuit groups communicatively coupled to the memory device, the plurality of circuit groups comprising:
a first circuit group to:
determine one or more intra-prediction modes, each having a corresponding cost;
provide the one or more intra-prediction modes to a second circuit group; and
the second circuit group communicatively coupled to the first circuit group, the second circuit group to:
receive the one or more intra-prediction modes;
calculate, for a first chroma component, a first cost of a chroma-from-luma intra-prediction mode, wherein to calculate the first cost, the second circuit group is to:
generate a first plurality of blocks of predicted pixels, wherein each block of predicted pixels corresponds to a different alpha value of a plurality of alpha values;
calculate, for each block of the first plurality of blocks, a difference between the predicted pixels of the block and corresponding source pixels;
calculate, for each block of the first plurality of blocks, a first block cost; and select, based on the calculated first block cost of each block of the first plurality of blocks, a first alpha value of the plurality of alpha values; and calculate, for a second chroma component, a second cost of the chroma-from-luma intra-prediction mode;

calculate a final cost based on the first code and the second cost;

select, based on each corresponding cost of the one or more intra-prediction modes and the final cost, a final intra-prediction mode;

generate, based on the selected final intra-prediction mode, a block of predicted pixels that approximates a block of source pixels of an image frame; and encode the selected first alpha value in a bitstream.

18. The system of claim 17, wherein to calculate the second cost, the second circuit group is further to:

generate a second plurality of blocks of predicted pixels, wherein each block of predicted pixels corresponds to a different alpha value of a plurality of alpha values;

calculate, for each block of the second plurality of blocks, a difference between the predicted pixels of the block and corresponding source pixels;

calculate, for each block of the second plurality of blocks, a second block cost; and select, based on the calculated second block cost of each block of the second plurality of blocks, a second alpha value of the plurality of alpha values.

19. The system of claim 18, wherein the second circuit group is further to encode the second alpha value in the bitstream, wherein the selected first alpha value and the selected second alpha value are not both zero.

20. The system of claim 17, wherein to calculate the first block cost, the second circuit group is further to calculate a sum of absolute Hadamard-transformed differences based on the calculated difference.

* * * * *